(12) United States Patent
Rossanese

(10) Patent No.: US 7,462,315 B2
(45) Date of Patent: Dec. 9, 2008

(54) PROCESS FOR THE PRODUCTION OF PLATES MADE OF PLASTIC MATERIAL WITH PARTS OVERMOLDED BY INJECTION-COMPRESSION

(75) Inventor: Afro Rossanese, Noventa di Piave (IT)

(73) Assignee: Inglass S.p.A., San Polo Di Piave (Treviso) (IT)

( * ) Notice: Subject to any disclaimer, the term of this patent is extended or adjusted under 35 U.S.C. 154(b) by 738 days.

(21) Appl. No.: 11/047,104

(22) Filed: Jan. 31, 2005

(65) Prior Publication Data

US 2005/0173831 A1    Aug. 11, 2005

(30) Foreign Application Priority Data

Oct. 11, 2004   (IT) ............................ TO2004A0703

(51) Int. Cl.
*B29C 31/00* (2006.01)
(52) U.S. Cl. ............... 264/259; 264/319; 264/328.1
(58) Field of Classification Search ............... 264/328.1, 264/328.7, 328.8, 255, 259, 319, 297.2, 297.8; 425/555, 135, 130, 134
See application file for complete search history.

(56) References Cited

U.S. PATENT DOCUMENTS 4,874,654 A * 10/1989 Funaki et al. ............... 428/192

FOREIGN PATENT DOCUMENTS

| DE | 10217584 | * 11/2002 |
| JP | 5-329898 | * 12/1993 |
| JP | 2001-150484 | * 6/2001 |

OTHER PUBLICATIONS

U.S. Appl. No. 11/047,480, filed Jan. 31, 2005, Rossanese et al.
U.S. Appl. No. 11/047,500, filed Jan. 31, 2005, Rossanese et al.
U.S. Appl. No. 11/047,498, filed Jan. 31, 2005, Rossanese et al.
U.S. Appl. No. 11/047,483, filed Jan. 31, 2005, Rossanese et al.
U.S. Appl. No. 11/047,106, filed Jan. 31, 2005, Rossanese et al.
U.S. Appl. No. 11/047,481, filed Jan. 31, 2005, Rossanese et al.
U.S. Appl. No. 11/046,937, filed Jan. 31, 2005, Rossanese et al.

* cited by examiner

*Primary Examiner*—Jill L Heitbrink
(74) *Attorney, Agent, or Firm*—Heslin Rothenberg Farley & Mesiti P.C.; Victor A. Cardona, Esq.

(57) ABSTRACT

Described herein is a process for the production of articles made of plastic material, in particular transparent plates, with parts made of plastic material at least in part overmolded on The plate by means of injection-compression, excluding from the compression areas of connection between the overmolded parts and the plate.

5 Claims, 2 Drawing Sheets

PROCESS FOR THE PRODUCTION OF PLATES MADE OF PLASTIC MATERIAL WITH PARTS OVERMOLDED BY INJECTION-COMPRESSION

CROSS-REFERENCE TO RELATED APPLICATIONS

This application claims priority from Italian application number TO2004A000703, filed on Oct. 11, 2004, the entire disclosure of which is incorporated herein by reference.

This application also relates to U.S. patent application Ser. No. 11/047,480, filed on Jan. 31, 2005, and titled "AN APPARATUS AND A METHOD FOR THE INJECTION-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,500, filed on Jan. 31, 2005, and titled "A PROCESS FOR THE PRODUCTION OF PLATES MADE OF TRANSPARENT PLASTIC MATERIAL WITH NON-TRANSPARENT AREAS," the contents of which are incorporated herein by reference.

This application also relates to U.S. patent application Ser. No. 11/047,498, filed on Jan. 31, 2005, and titled "A PROCESS FOR THE PRODUCTION OF PLATES MADE OF TRANSPARENT PLASTIC MATERIAL WITH NON-TRANSPARENT OVERINJECTED PARTS," the contents of which are incorporated herein by reference.

This application also relates to U.S. patent application Ser. No. 11/047,483, filed on Jan. 31, 2005, and titled "A METHOD AND AN APPARATUS FOR THE PRODUCTION OF ARTICLES MADE OF MOULDED PLASTIC MATERIAL PARTICULARLY BY MEANS OF INJECTO-COMPRESSION," the contents of which are incorporated herein by reference.

This application also relates to U.S. patent application Ser. No. 11/047,106, filed on Jan. 31, 2005, and titled "AN APPARATUS AND A METHOD FOR INJECTO-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,481, filed Jan. 31, 2005 and titled "A METHOD FOR THE PRODUCTION OF PLATES MADE OF PLASTIC MATERIAL WITH PARTS OVERMOULDED BY INJECTION COMPRESSION," the contents of which are incorporated herein by reference.

This application also relates to U.S. patent application Ser. No. 11/046,937, filed on Jan. 31, 2005, and titled "AN APPARATUS AND A PROCESS FOR THE INJECTO-COMPRESSION MOULDING OF ARTICLES MADE OF PLASTIC MATERIAL WITH TWO COMPONENTS," the contents of which are incorporated herein by reference.

FIELD OF THE INVENTION

The present invention relates to the production of articles made of plastic material in general, particularly (but not exclusively) plates, with overmoulded parts.

The plates to which the invention applies can be either transparent ones (such as windows for the automotive field and screens for plasma televisions) or non-transparent ones, and also the parts overmoulded thereon may be either transparent ones or non-transparent ones, made of the same material as that of the plates or of different material. Said parts moreover may be overmoulded in peripheral areas of the plate, for example in a continuous or discrete way along its peripheral edge or else in different areas.

For convenience of treatment, reference will, however, be made in what follows to plates made of transparent plastic material and to overmoulded parts made of non-transparent plastic material, where it is understood that said definitions include also any other different combination in the terms clarified above.

STATE OF THE PRIOR ART

Traditionally, plates made of transparent plastic material are produced by means of injection moulding: the transparent material, typically polycarbonate, is much more sensitive than other plastic materials to lines of flow, joints, etc., so much so that, as the dimensions of the products increase, the difficulties of injection are such that it is impossible to eliminate some typical aesthetic and optical defects unless very sophisticated injection systems are adopted. For items of modest dimensions, the so-called "film-injection" system is effectively used. This system enables many of the problems typical of these transparent plastic materials to be solved, but as the dimensions increase, it does not enable sufficiently high levels of quality to be achieved. Furthermore, this type of injection involves cutting of the appendage of the film projecting from the moulded plate, said appendage having a non-negligible mass with respect to that of the product and involving an evident waste of material.

Furthermore, for these transparent plates, in relation to the different applications for which they are designed (and in particular in the case of use in the automotive sector), the reduction of residual internal stresses ("in-mould stresses") is of fundamental importance. These stresses tend in fact to deform the product, altering its mechanical and above all optical properties.

To solve these problems, there have been proposed systems for moulding transparent plates of large dimensions by means of injection-compression, i.e., via a step of injection and a simultaneous or subsequent step of compression, for example performed by means of apparatuses that use a press of the stack-mould type, as described in the German patent application No. DE-A-10217584.

Further critical problems relate to the subsequent formation of the overmoulded parts made of non-transparent plastic material. During moulding of these parts serious difficulties are encountered to prevent the transparent plate previously formed from being subject to deformations in areas of connection, i.e., at the edge of division between the surface of the plate and the overmoulded parts. It is in fact practically impossible to prevent localized deformations in said areas, which give rise to optical defects, normally referred to as "window effect" by persons skilled in the sector.

The acceptable deformations, since they are in the specific case of an item that reflects the light and hence is seen from different angles as a mirror, must, instead, be very reduced from the dimensional standpoint, also taking into account the effects of variation of the index of refraction of the transparent material, as has been said typically polycarbonate, when said material undergoes stress. The admissible deformations must therefore be very modest and, taking into account that the conditions of moulding both at the level of temperature and at the level of pressure for transparent material and non-transparent material are very similar, it is difficult to identify optimized conditions of moulding that enable the second material to be overmoulded correctly, without altering the shape or the structure of the first material.

FIGS. 1 and 2 of the annexed plate of drawings exemplify, respectively, a transparent plate 1 (or a part thereof), on the dorsal surface of which there is overmoulded a part made of non-transparent plastic material 2, typically a continuous or discontinuous perimetral element, of which the part of connection 3 with the plate 2 is tapered, i.e., it has a thickness decreasing towards the plate 1, and terminates with an edge of division 4.

FIG. 1 illustrates an ideal situation, without apparent deformations of a plate 1 with an overmoulded component 2.

FIG. 2 illustrates, instead, a real situation, corresponding to overmoulding of the non-transparent part 2 on the plate 1 with conventional techniques. As may be seen in said figure, there are present at least three defects: a depression D1 on the front surface of the transparent plate 1 induced by the overmoulding of the part 2, a depression D2 along the area of connection 3 of the overmoulded part 2 adjacent to the edge of division 4, and a concentrated compression D3 of the edge of division 4 between the overmoulded part 2 and the dorsal surface of the plate 1.

These deformations are due principally to an incorrect moulding of the part 2, and in particular to overpressures, which, as has been explained, result in optical effects of the plate 1 readily identifiable visibly and hence unacceptable.

SUMMARY OF THE INVENTION

The purpose of the present invention is to solve the aforesaid problem, overcoming the limitations imposed by the traditional systems of overmoulding and enabling an efficient production of plates made of transparent material (or, as has been said, also non-transparent material) with non-transparent parts (or, as has been said, also transparent parts), which have optimal aesthetic, optical, as well as mechanical properties and are free from deformations.

With a view to achieving said purpose, the subject of the present invention is a process for the production of plates made of plastic material with overmoulded parts made of plastic material, basically characterized in that said parts made of plastic material are overmoulded on the plate by means of injection-compression, excluding from the compression areas of connection between said overmoulded parts and said plate.

Thanks to this idea of solution, it is possible to prevent effectively the onset of the defects D1, D2 and D3 described previously.

BRIEF DESCRIPTION OF THE DRAWINGS

The invention will now be described in detail, purely by of way of non-limiting example, with reference to an example of embodiment of the process according to the invention.

In the drawings.

DETAILED DESCRIPTION OF THE INVENTION

Figure 1:
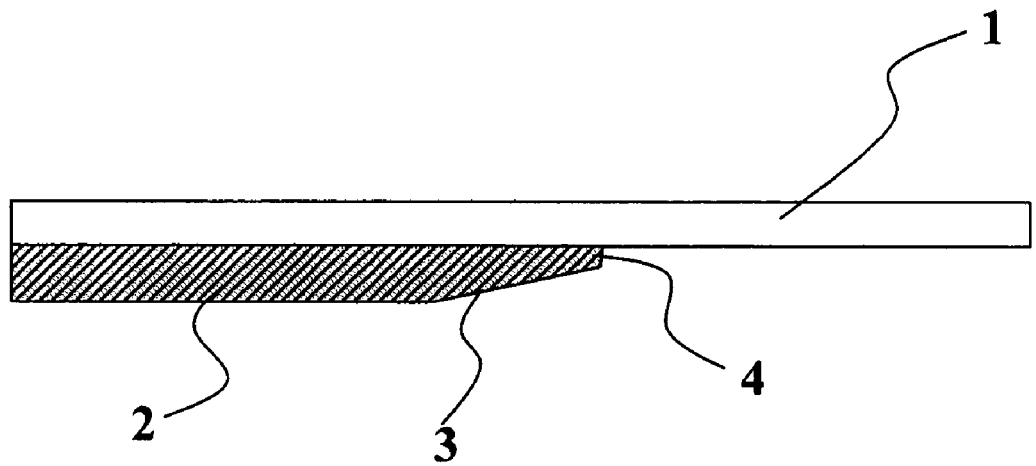
FIG. 1 is a schematic partially cross-sectional view of a plate made of plastic material with parts overmoulded using the process according to the invention.
Figure 2:
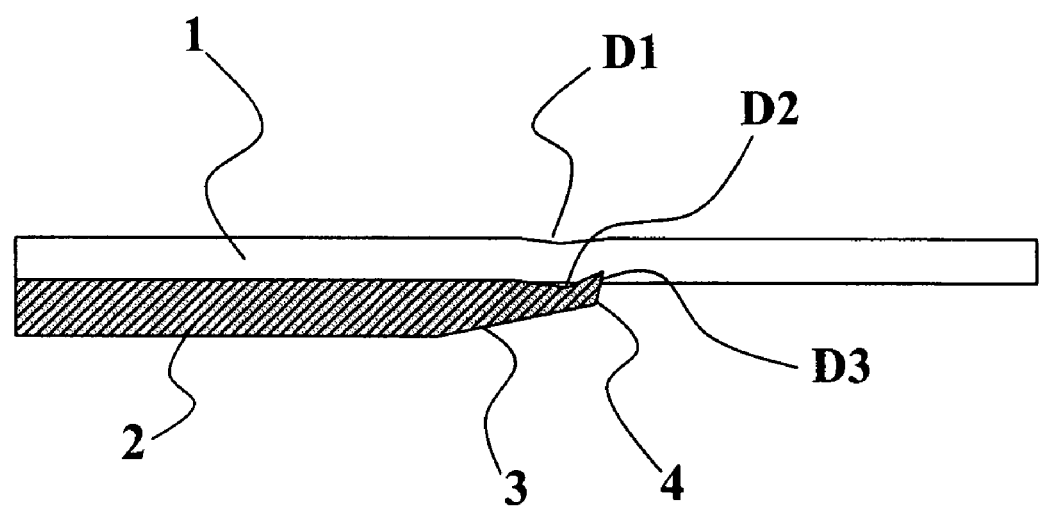
FIG. 2 is a view similar to that of FIG. 1, which shows the typical defects deriving from processes of overmoulding not in accordance with the invention.
Figure 3:
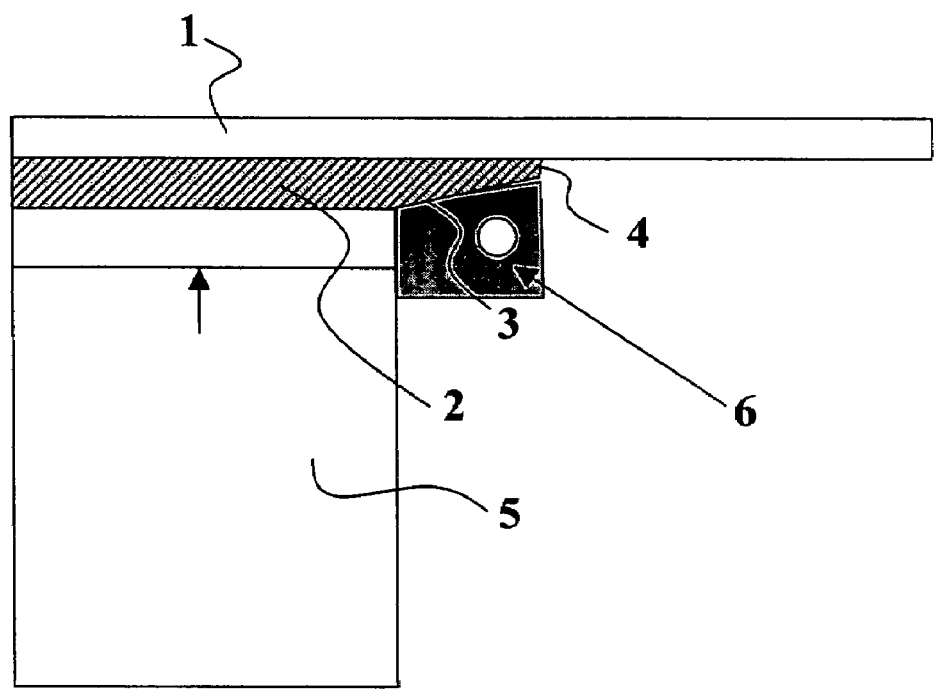
FIG. 3 is a schematic representation of the modalities of overmoulding with the process according to the invention.

The example illustrated relates to the plate made of transparent plastic material 1 and to the peripheral element 2 made of non-transparent plastic material, already considered with reference to FIGS. 1 and 2.

In general terms, the process for the production of such a bi-component product envisages two successive steps, which can be implemented both with a press for injection moulding equipped with a rotating plate and with a press of the stack-mould type with rotating central surface, for example of the type described in the already cited document No. DE-A-10217584.

The first step envisages the formation of the plate 1, by means of injection and—conveniently—compression within a mould, the latter performed simultaneously with or subsequently to injection.

This step may be conducted with peculiar solutions, which form the subject of parallel Italian patent applications filed on the same date by the present applicant.

Then, the mould, within which the plate 1 has been formed, is transferred from a first moulding station to a second moulding station, for the performance of the second step consisting in overmoulding of the non-transparent part 2.

The non-transparent material is overinjected on the dorsal surface of the plate 1 and subjected, simultaneously with or subsequently to a step of compression carried out as a result of the approach of a countermould 5 to the mould containing the plate 1.

Also in this case, the steps of injection and compression may be performed using specific and original solutions which form the subject of parallel Italian patent applications filed on the same date by the present applicant.

The countermould 5 or, in any case, the mobile element that carries out the compression of the non-transparent part 2, does not act on the entire extension of said part 2 (as is, instead, represented in FIG. 4), but is obtained in such a way as to exclude the compression of the area of connection 3 between the part 2 and the plate 1, and evidently also the edge of mutual division 4.

An insert 6 may possibly be provided on the mould in the area of forming of the area of connection 3, for the purpose of obtaining both a particular conditioning and bleeding-off of air for a better filling of the moulding cavities of the part 2, which in any case will not be subjected to compression.

At the end of the step of compression, the bi-component product thus obtained will present the ideal conformation represented in FIG. 1, free from structural and consequently optical defects, such as the ones (D1, D2, D3) described previously with reference to FIG. 2.

Figure 4:
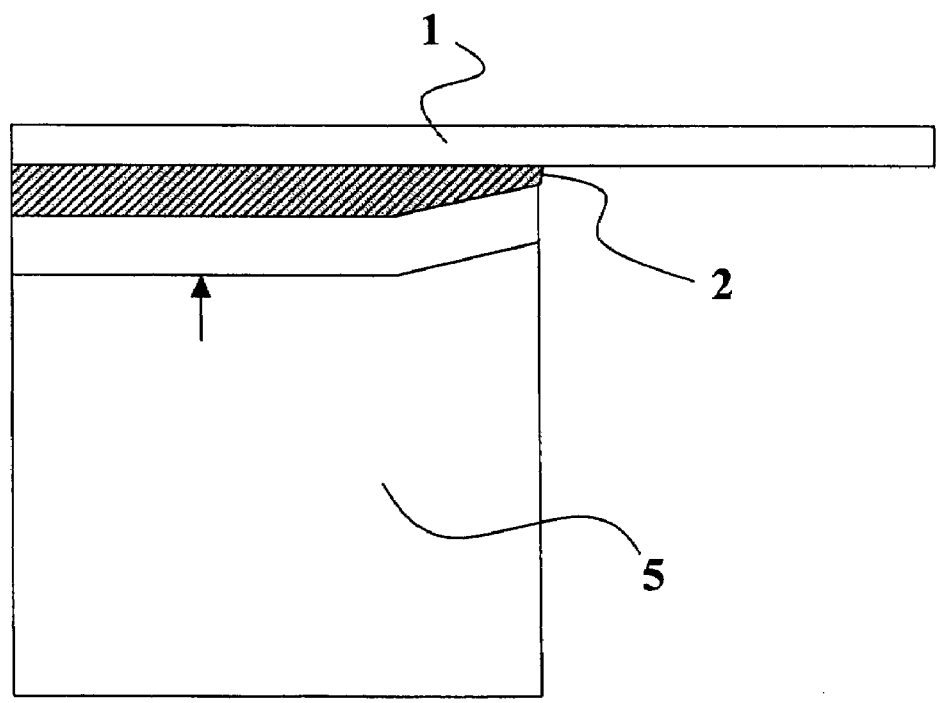
FIG. 4 is a view similar to that of FIG. 3, which shows a methodology of overmoulding not in accordance with the invention.

Said defects will, instead, be generally present in the case where the overmoulding of the part 2 were performed in the way represented in FIG. 4, i.e., by application via compression also to the area of connection 3 between the part 2 and the plate 1 and to the edge 4 of mutual division.

Of course, the modalities of embodiment of the process according to the invention may vary widely with respect to what is described and illustrated herein, without thereby departing from the scope of the present invention, as defined in the ensuing claims. Consequently, for example, injection-compression may be applied to some of the overmoulded parts of the plate, whereas for others other methodologies may be used. Furthermore, as already clarified at the start, the process according to the invention applies to plates (or in any case not necessarily web-like products) made of transparent plastic material or otherwise, and also the overmoulded parts may be either transparent ones or non-transparent ones, made of different material or of the same material as that of the plate. Said parts may moreover be overmoulded, instead of in a peripheral area of the plate, in different areas, and present continuous or discontinuous configurations.

The invention claimed is:

1. A process for the production in moulds of a plate made of plastic material, with an overmoulded part made of plastic material, the process comprising:
    at least partially overmoulding the part on the plate by injection-compression;
    said part overmoulded by injection so as to be superimposed to a peripheral area of the plate, said part having a portion with a thickness decreasing towards the plate; and
    compressing the part following the injection, and avoiding compressing the portion with decreasing thickness.

2. The process according to claim 1, wherein further comprising providing an insert on the mould in the area of forming of the areas of connection between said overmoulded parts and the plate.

3. The process according to claim 1, wherein the plate is made of transparent plastic material, and said overmoulded parts are made of non-transparent plastic material.

4. The process according claim 1, wherein said plate is moulded by means of injection-compression.

5. The process according to claim 1, wherein the injection-compression comprises compression using a stack-mould press.

* * * * *